United States Patent [19]
Allen et al.

[11] Patent Number: 5,453,129
[45] Date of Patent: Sep. 26, 1995

[54] OIL SPILL RECOVERY METHOD

[75] Inventors: Martin A. Allen; John T. Fetcko, both of Dawsonville, Ga.

[73] Assignee: Exxon Chemical Patents Inc., Linden, N.J.

[21] Appl. No.: 161,326

[22] Filed: Dec. 2, 1993

Related U.S. Application Data

[62] Division of Ser. No. 9,408, Jan. 27, 1993, Pat. No. 5,268,106, which is a continuation of Ser. No. 697,090, May 8, 1991, abandoned.

[51] Int. Cl.⁶ ..................................................... B08B 7/00
[52] U.S. Cl. ..................... 134/4; 134/6; 134/10; 134/40; 134/42
[58] Field of Search ..................... 134/4, 42, 10, 134/40, 6; 210/924, 922, 925

[56] References Cited

U.S. PATENT DOCUMENTS

| | | | |
|---|---|---|---|
| 3,962,083 | 6/1976 | Goldman | 210/924 |
| 4,832,852 | 5/1989 | Wells et al. | 134/6 |
| 5,227,072 | 7/1993 | Brinkley | 210/924 |
| 5,229,006 | 7/1993 | Brinkley | 210/924 |
| 5,268,106 | 12/1993 | Allen et al. | 210/924 |

*Primary Examiner*—David A. Simmons
*Assistant Examiner*—Zeinab El-Arini
*Attorney, Agent, or Firm*—Robert L. Graham

[57] ABSTRACT

A method and apparatus for oil cleanup or protection includes meltblowing equipment mounted on a vessel or vehicle for the generation and deposition of an oil absorbent web at the site of the spill.

6 Claims, 6 Drawing Sheets

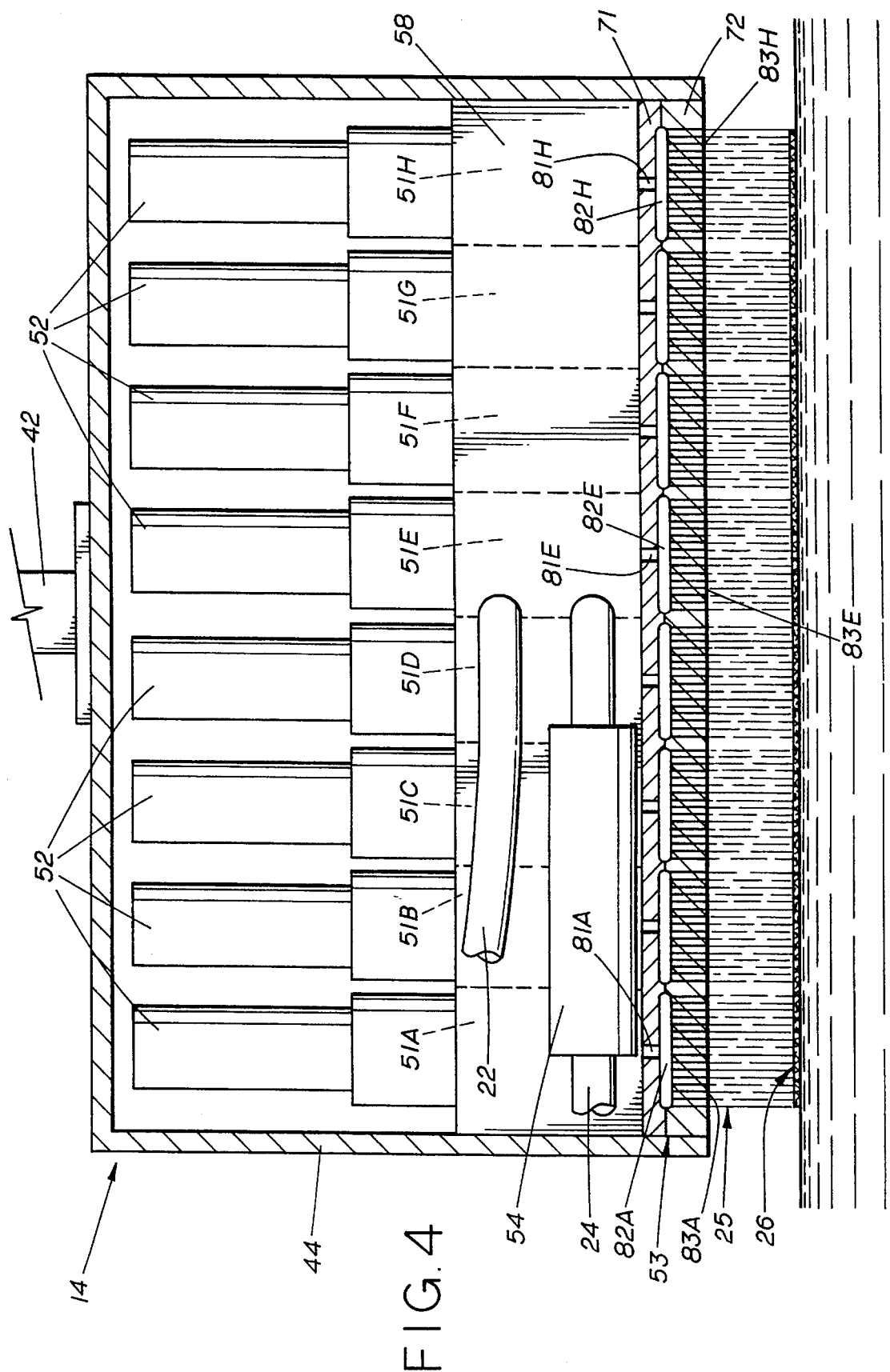

OIL SPILL RECOVERY METHOD

RELATED APPLICATIONS

This is a division of U.S. application Ser. No. 009,408, filed on Jan. 27, 1993, now U.S. Pat. No. 5,268,106, which is a continuation of U.S. application Ser. No. 697,090, filed on May 8, 1991, now abandoned.

FIELD OF THE INVENTION

The present invention relates to a method protecting the environment from oil spills. In one aspect, the invention relates to a method of recovering or containing oil spills on land or sea by the use of meltblown materials. In another aspect, the invention relates to protecting land surface from oil spills by meltblowing a layer or cover of hydrophobic polymeric microfibers onto the land contaminated or threatened by the spill.

BACKGROUND OF THE INVENTION

As evidenced by the recent oil spills in Alaska and the Gulf of Mexico, there is an urgent need to improved techniques for protecting the environment from the spills. Efforts to mitigate the effects of offshore oil spills include chemical dispersion and the use of absorbent pads. Chemicals are sometimes effective to disperse the oil into the water if applied shortly after spill. However, it is not always possible to respond with dispatch because of a variety of reasons, such as the remote location of the spill, lack of chemicals, and weather. Moreover, the long term effects of many dispersants on the ecology have not been fully tested.

If chemical dispersants cannot be used on offshore spills, then the only other remedy to oil spill has been recovery or containment by a variety of mechanical devices, most of which employ some type of absorbent material for separating the oil from the water. Meltblown polypropylene material applied as pads or booms, have received widespread use. The oleophilic property of the polypropylene combined with the microsized fibers of the meltblown web exhibit excellent absorption for the oil. The absorbent pads or booms however suffer from the following disadvantages:

(1) they have low bulk densities (1 to 6 pounds per cubic foot) so that large volumes must be transported to the spill site, presenting a serious logistics problem;

(2) they are cumbersome to deploy (the individual pads are difficult to interconnect);

(3) they are not always suited for land, particularly on irregular terrain.

The following patents are representative of polyethylene and/or polypropylene films, sheets and booms used in oil cleanup operations: U.S. Pat. Nos. 3,146,192; 3,426,902; 3,314,540; 3,259,245; 3,358,838; 3,265,616; 3,215,623; 3,219,190; 3,214,368. U.S. Pat. No. Re. 31,087 is of particular interest because it discloses microfibrous pads laid on the water to remove oil therefrom.

SUMMARY OF THE INVENTION

In accordance with the present invention, a portable vehicle or vessel is provided with meltblowing equipment to prepare and deposit the meltblowing web in situ of the oil spill.

In one embodiment, the process of the present invention comprises, broadly, meltblowing microfibers onto water or land at or near the situs of an oil spill (or other toxic substance spill) at such a rate to form a web thereon to absorb or contain the oil spill. Meltblowing is a well recognized process for forming nonwoven products of microsized polymer fibers.

The process involves four steps which, in accordance with one embodiment the present invention, must be carried out on a mobil vessel or vehicle:

(a) converting resin to a polymer melt;

(b) delivering the melt to meltblowing die positioned at a remote offboard location;

(c) delivering hot air to the meltblowing die; and (d) meltblowing the polymer melt from the die by use of the hot air thereby depositing a continuous web onto the surface of the water.

(Unless otherwise indicated the term "vessel" as used herein will include vehicle to indicate that the invention may be carried out on land as well as the sea. A distinction between these two applications, however, will be made in connection with forming a protective layer on the land.)

The advantages of the present invention over prior art methods for containing or cleaning up oil spills are several, the most important Of which are discussed below.

(a) Response Time: In offshore oil spills, it is important and sometimes critical to respond quickly to the spill. A quick response will not only result in containment of the spill but will prevent the oil from weathering and possibly sinking below the water surface. An emergency vessel equipped with the meltblowing equipment and supplies described herein can respond immediately to an oil spill.

(b) Effective Placement of Barrier or Absorbent Material: By the in Situ formation of the meltblown web, a long, continuous, integral web of microsized fiber can be strategically placed to contain or absorb the oil. Meltblown pads of the prior art are individual pieces ranging in size from 2 to 4 square feet of coverage. As mentioned above, these pieces are difficult to join together to produce a continuous barrier or absorbent. The individual pieces also are difficult to control or maneuver and retrieve.

(c) Improved Logistics: The simple logistics of loading, transporting and placing the bulky meltblown pads limits their utility. The density of typical meltblown pads is about 5 pounds per cubic foot which means that about 90% of the bulky pads are voids. The bulk density of particulate (e.g., polypropylene) resin is about 45 pounds per cubic foot so that each 1000 cubic feet of vessel resin storage translates into about 34,500 square feet of coverage of a web ⅜ inches thick compared to only 3,900 square feet of the same volume of ⅜ inch preformed pads. Thus, for a given volume of starting materials (e.g., resin vs. preformed pads), application of the meltblown web by the present invention produces about 9 times more coverage than with preformed pads at the same thickness.

(d) Ecological Effects: The continuous integrated web can readily be retrieved by take up rolls or similar devices. Chemicals used to disperse the oil which may lend themselves to rapid placement may present ecological problems.

(d) Better Coverage on Land: The in situ placement of the meltblown web in accordance with the present invention for the first time offers protection for land sites. The blowing of the microsized fibers by hot air onto the land causes the fibers to conform to the terrain, (e.g., beach). This forms a protective coating on the beaches to protect it against oil washed up onto the shore. If an oil spill does wash up onto the shore prior to placement of the web, the meltblowing of microsized fibers onto the contaminated shore penetrates crevices and openings and absorbs the oil by the capillary and oleophilic nature of the fibrous web.

These and other advantages will be apparent to those skilled in the art.

BRIEF DESCRIPTION OF THE DRAWINGS

FIG. 4 is a sectional view of the meltblowing die shown in FIG. 3, with the cutting plane taken along line 4—4 thereof.

DESCRIPTION OF THE PREFERRED EMBODIMENTS

As mentioned previously, the present invention employs meltblown material in oil cleanup. However, unlike prior art cleanup techniques, the meltblown web in accordance with the present invention is generated at the site of the spill.

Meltblowing is a process wherein polymer fibers (i.e., filaments) are extruded through a row or rows of orifices while hot air converging on the fibers stretches and attenuates them into microsize diameters. The fibers are collected in a random entangled mass forming a cohesive integral web.

Many of the polymers, such as polypropylene, used in meltblowing exhibit hydrophobic-oleophilic properties. This property coupled with the microsized fibers make them ideal oil absorbents for oil.

Although the present invention will be described with specific reference to oil (e.g., petroleum crude oil or refined oil), it again is to be emphasized that the invention has application in other cleanup operations involving toxic liquids capable of being absorbed or contained by the meltblown webs. The term "oil" is intended to cover a variety of toxic wastes such as crude oil, refined oil, petrochemical liquids, insecticides, dioxides, etc.

The meltblowing equipment and vessel for carrying out the process of the present invention can take a variety of forms. The principal meltblowing components common to all will preferably include the following, all of which will be mounted on or controlled from the vessel:

(a) a meltblowing die positioned offboard and proximate the surface of the water or land;

(b) a delivery system for delivering a polymer melt to the meltblowing die;

(c) resin storage and transfer facilities; and (d) an air compressor, hoses and heater for delivering hot air to the meltblowing die.

Figure 1:
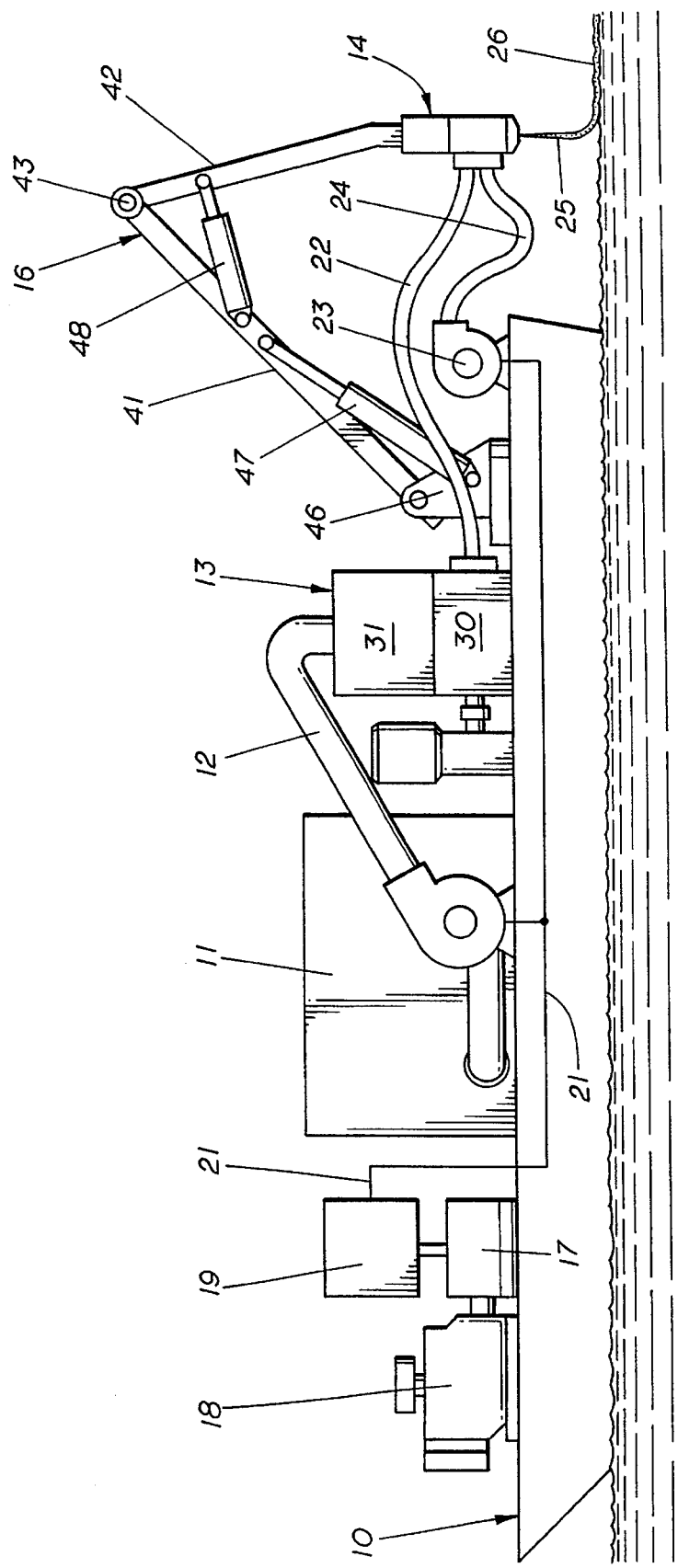
FIG. 1 is a simplified side elevational schematic of a vessel equipped with meltblowing equipment in accordance with the present invention.

With reference to FIG. 1, a vessel 10 is shown (in schematic) equipped with a preferred apparatus for carrying out the method of the present invention. The apparatus comprises the following: a resin storage bin or compartment 11 provided with an outlet transfer conduit 12, a polymer delivery system 13 for receiving the resin an converting it to a polymer melt, and a meltblowing die assembly 14 mounted off-board the vessel by articulated boom 16.

An electric power generator 17 driven by engine 18 and control led by controller 19 provides electric power (110 v and/or 220 v) for the electric components of the equipment and electric source (with suitable transformers) for the controls. The electric conductors through conduit 21 leads to the various electrical components of the system. Since the electric generation, controls and wiring are well within the skill of the art, these facilities are only schematically illustrated.

Briefly, the resin is transferred from storage 11 through pipe 12 by conveyor, auger, or air to the hopper 31 of the polymer delivery system 13. The resin is melted and delivered through flexible line 22 to the die assembly 14 while air from compressor 23 is also delivered to the die assembly 14 by line 24.

Figure 3:
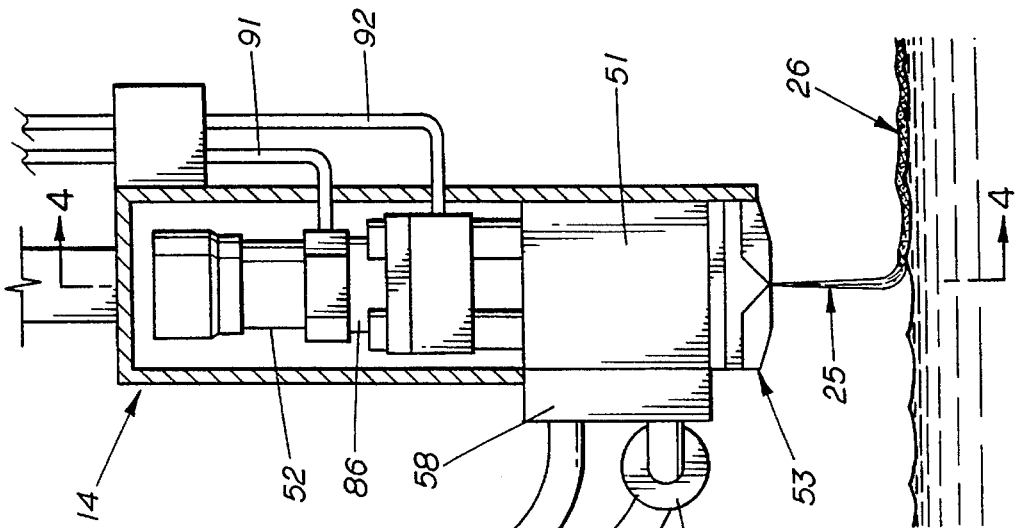
FIG. 3 is an enlarged, side elevational view of a meltblowing die shown in FIG. 1.
Figure 2:
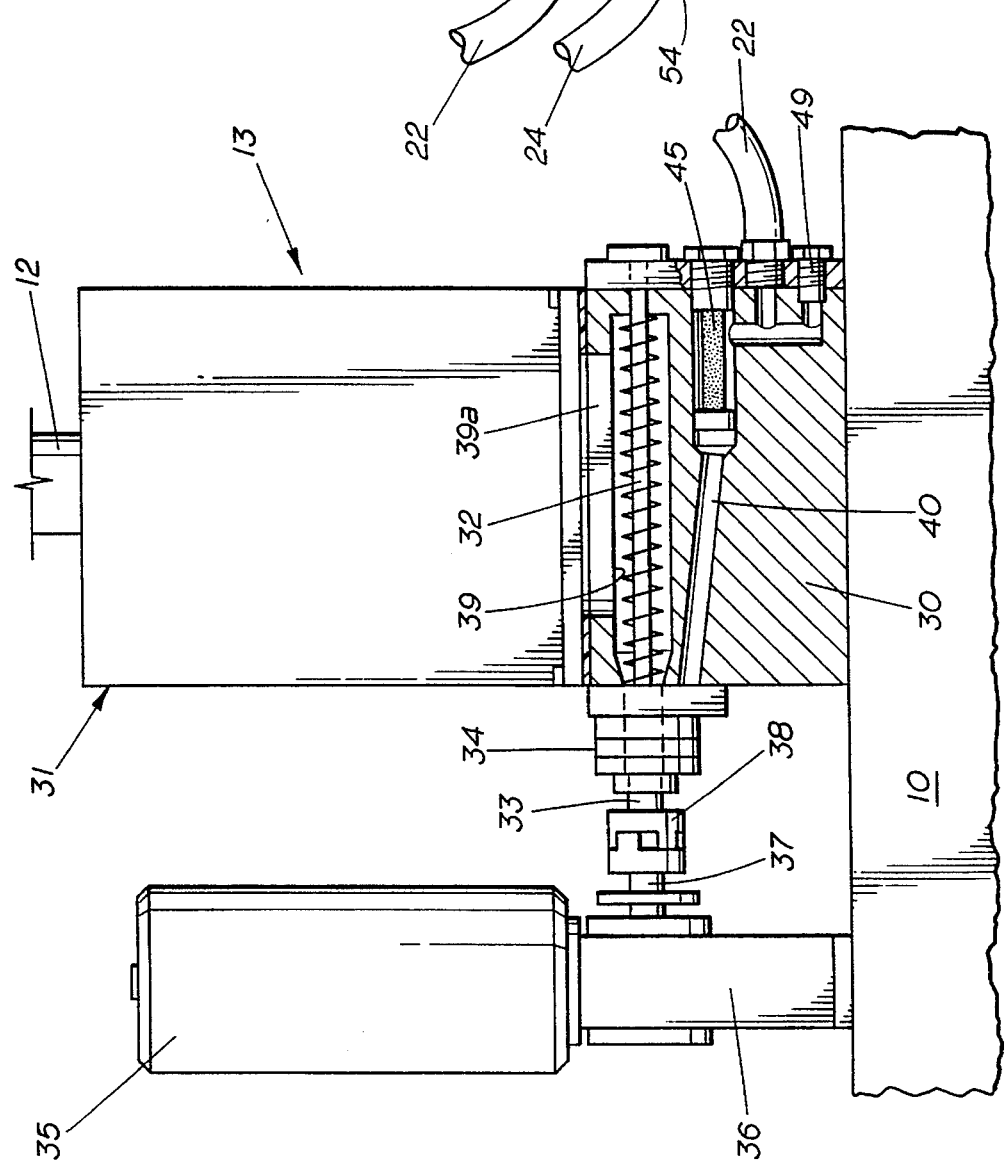
FIG. 2 is a side elevational view of a polymer delivery system showing in FIG. 1 for delivering a polymer melt to the die.

The polymer melt is extruded through a row or rows of tiny orifices in the die 14 to form strands 25 (see FIGS. 2 and 3). The hot air converging on either side of the row of strands contacts them and by drag forces stretches them to microsized fibers generally from 0.1 to 20 microns in diameter. (The fibers are sometimes referred to as filaments.)

In addition, the hot air delivers and deposits the microsized fibers onto the water surface as a web 26 of random entangled fibers. Movement of the vessel 10 or web 26 produces a continuous web on the surface. The thickness of the web can be controlled by the rate of movement of the vessel or web. The web is continuous and integral and floats on the water. Note that the bulk density of the web 26 is about 10% of the bulk density of the resin in the storage bin. The method of the present invention therein provides about 10 times increase in meltblown web volume compared to the volume of the stored resin. The importance of this feature for remote areas of the world where time is of the essence cannot be overemphasized.

The key components of the present invention are the polymer melt and delivery system, 13, the meltblowing die assembly 14 (including boom 16) and the hot air system. These are described in detail below.

Polymer Melt and Delivery System

A variety of systems for converting resin to molten form may be used, including conventional extruders and electric heaters. It is preferred, however, to employ the system described in U.S. patent application Ser. No. 447,930, filed Dec. 8, 1989, the disclosure of which is incorporated herein by reference. This system is compact and energy efficient, lending itself to portable applications.

As illustrated schematically in FIG. 2, the polymer delivery system 13 broadly comprises a heated body 30, a hopper 31 (with resin preheating means) mounted on the body 30, and auger screw 32 mounted in chamber 39 on shaft 33, a rotary positive displacement pump 34 (e.g., gear pump) mounted on shaft 33, and primemover 35 for driving shaft 33. The primemover 35 (e.g., electric motor) drives shaft 33 through gear box connection 36, shaft 37 and coupling 38.

Briefly, the operation is as follows: resin is preheated and melted in hopper 31 and is gravity fed to the auger screw chamber 39 in the heated body 30 through opening 39a. The screw 32 force feeds the melt to the gear pump 34 which pumps the melt through pump discharge passage 40 in the heated body 30 and to the die assembly 14 through flexible hose 22. The pump pressure is sufficient to extrude the melt through the extrusion die. As mentioned previously details of the polymer delivery system 13 are described in U.S. patent application Ser. No. 447,930 and need not be repeated here. As described in the Application, the polymer delivery system may include a filter 45 and a pressure activated by-pass valve 49 to return melt to the inlet of chamber 39 and thereby to permit intermittent operation.

Die Assembly and Boom

Figure 5:
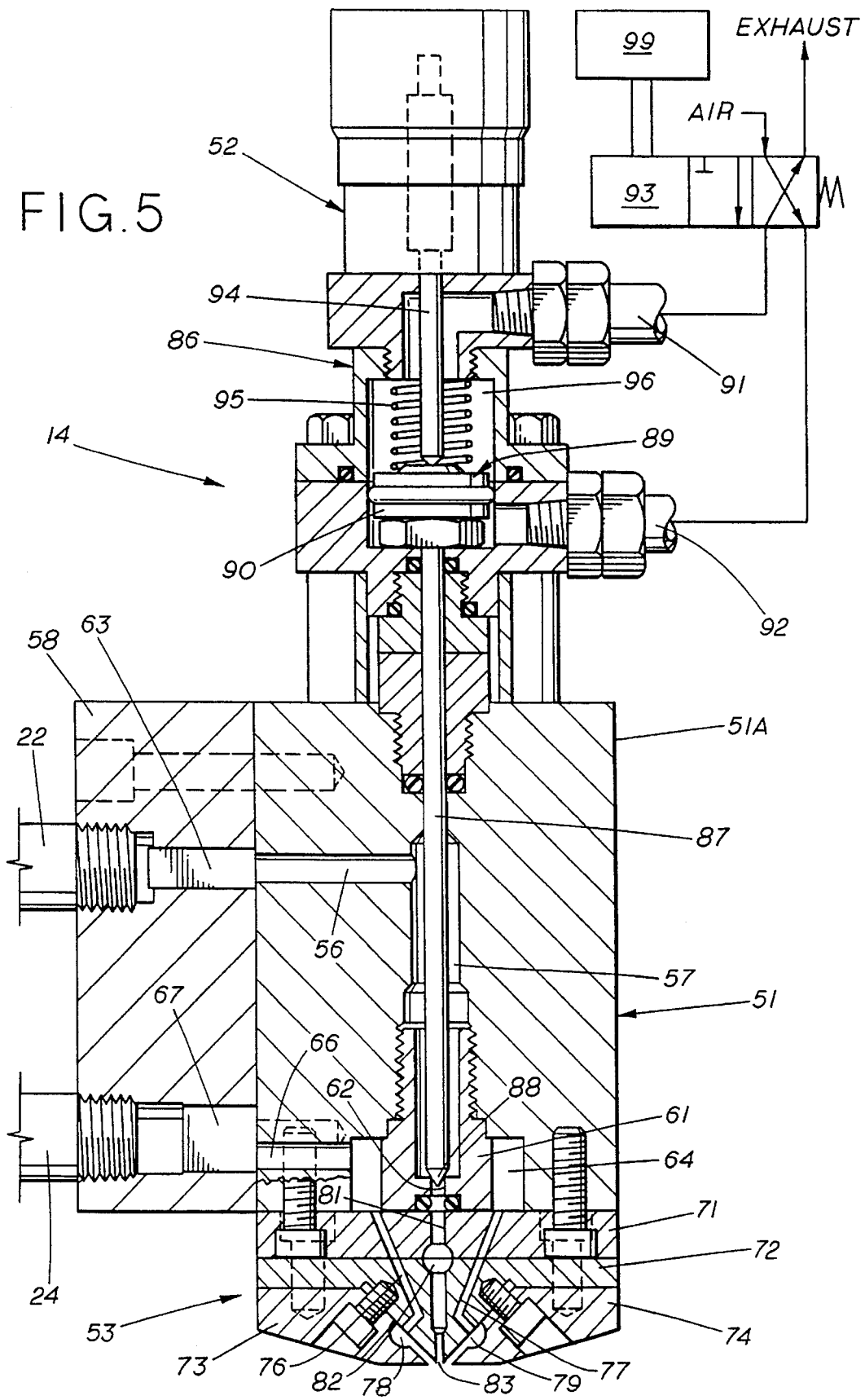
FIG. 5 is an enlarged sectional view of the meltblowing die shown in FIG. 3, with portions cut away to illustrate details.

The die assembly 14 is mounted on the end of articulated boom 16, which includes members 41 and 42 pivotally interconnected at 43. The die assembly 14, as best seen in FIG. 5, is connected to the outer end of arm 42 by U-frame 44. Returning to FIG. 1, arm 41 is pivotally attached to an on-board mounting base 46 which may pivot about a vertical axis. Hydraulic ram 47 provides vertical movement to the boom 16 and hydraulic ram 48 provides horizontal movement. The hydraulics for operating the rams (not shown) may be conventional. The boom 14 and associated equipment are presented schematically, as a variety of conventional constructions and designs are possible and are well within the skill of the art.

The meltblowing die assembly 14 useable in the present invention is preferably of modular construction and capable of intermittent operation. The intermittent operation feature is important because during meltblowing of the web onto the water or land, it may be necessary to interrupt operations. Meltblowing dies that are not capable of intermittent operation could become plugged by polymer setting up in the die orifices and passages during shut down periods. The die assembly disclosed in U.S. application Ser. No. 599,006, filed Oct. 17, 1990, is particularly suited for use in the present invention because it is mobile, maneuverable, modular construction, and features in-line air heating and intermittent and self cleaning operation. Since the die assembly is disclosed in detail in said application Ser. No. 599,006, it will be described only generally herein. The complete disclosure of said application Ser. No. 599,006 is incorporated herein by reference.

With reference to FIG. 3, the die assembly 14 comprises a body 51, valve actuator modules 52, die tip assembly 53, and air heater 54. The die body 51 comprises a plurality of separate units designated as 51A–51H (see FIG. 4), which function independent of one another (except that air system is common to all). The air is continuously flowed through the units. A valve actuator 52 is mounted on each unit. The length of the die body 51, and the number of units 51A–51H and associated valve actuators 52 may be varied to provide the web of the desired width.

Only one unit (51A) of the units 51A–51H will be described in detail, it being understood that the polymer and air passages formed in all of the units will be generally the same. The description with reference to FIGS. 4 and 5 of unit 51A and its associated actuator 52 will be without letter designation. However, each of the other units will have corresponding parts. The description with reference to Figures depicting more than one unit will include the letter designation to denote the separate units.

Referring first to FIG. 5, die body 51 has formed therein intersecting polymer passages 56 and 57. Passage 56 connects to polymer feed line 22 through header manifold 58, and passage 57 is vertically aligned with valve actuator 52 and die tip assembly 53.

The lower end of passage 57 is threaded for receiving insert 61 having port 62 formed therein. The inlet to port 62 is shaped to provide a valve seat.

The polymer passage of each unit is fed by a balancing header 63 formed in manifold 58 in the form of a clothes hanger spanning the inlets of passages 56 of each unit 51A–51H. The polymer flow through the body 51 is from line 22, through header 63, through flow passages 56 and 57 of each unit in parallel flow pattern, discharging through port 62 of each unit.

The bottom side of die body 51 has a machined out section which defines elongate air chamber 64. The circular inserts 61 of each unit mounted on the die body 51 as previously described separate the air chamber 64 from polymer flow passages. The air chamber 64 is continuous throughout the die body 51 and surrounds the unit inserts 61.

A plurality of air passages, one shown as 66, extend through die body 51 into chamber 64. The air passages 66 are distributed along the length of the die body to provide generally uniform flow of air into chamber 64. Air is fed by header 67 which may be formed in manifold 58.

As shown in FIG. 4, the electric in-line heater 54 is connected to the air inlet of manifold 58 immediately upstream of header 67. Air thus flows from air line 24 through heater 54, through air header 67, through air passages 66, in parallel flow, into chamber 64.

The die tip assembly 53 is mounted to the underside of the die body 51 and covers air chamber 64. This assembly comprises a stack up of three members: a transfer plate 71, a die tip 72, and air plates 73 and 74. The transfer plate 71 extends substantially the full length of die body 51 and is secured thereto.

Pairs of air passages 76 and 77 extend through the transfer plate 71 and to die tip 72 in the manner as best described in U.S. patent application Ser. No. 599,066 mentioned above. The air passages discharge into air slits 78 and 79 defined by the confronting surfaces of the die tip 72 and air plates. The slits 78 and 79 converge as illustrated FIG. 5 so that air passing therethrough intercept the extruded polymer strands a short distance from the die tip and impart drag forces thereto.

A central polymer passage 81 extending through the transfer plate 71 is aligned with port 62 and polymer passage 57 of the die body 51. As shown in FIG. 4, the confronting surfaces of the transfer plate 71 and the die tip 72 have channels formed therein defining elongate end-to-end chambers 82. Each chamber (e.g., 82A) extends substantially the width of its associated unit (51A) but is separated from its adjacent channel or channels. The chambers 82 of each unit are longitudinally aligned and in combination extend substantially the entire length of the plate 71. The ends of each chamber 82 are preferably closely spaced apart so that the orifice 83 spacing along the die tip are equally spaced substantially along the entire die tip length.

Extending through the die tip 72 are a plurality of polymer flow passages terminating in orifices 83 at the apex of the die tip.

Air flows from the chamber 64 through die assembly passages 76 and 77, through slits 78 and 79 exiting in converging streams of hot air on each side of the row of orifices 83, while polymer flows through each unit passage 57, through passage 81 into chamber 82, and from there through orifices 83. The polymer melt discharges as a plurality of strands or filaments which are contacted by the converging air sheets drawing the filaments down to microsize diameters.

The construction, assemblage of the die tip assembly 53 to the die body 51, and the configuration and number of air passages, polymer passages and chambers may be as described in said application Ser. No. 599,006.

The modular valve actuators 52 imparts intermittent flow of polymer through the die body 51 and the die tip assembly 53 for each unit. Depending on the valve stem construction, the intermittent flow is on-off or pulsating which can be programmed to produce the desired web and/or intermittently clean the polymer passages and orifices.

The mechanism for actuating the valve for either the on-off or pulse operations is the same and is shown in FIG. 5. The piston assembly 89 comprises a pneumatic valve actuator module 86 and a stem 87 having a valve tip 88 designed to cooperate with valve seat of port 62.

The valve actuator module 86 comprises piston assembly 89 for moving the stem 87 between an open and closed position in relation to port 62.

Air lines 91 and 92 communicate with the interior of air chamber 96 of the piston assembly 89 and serve to conduct air to and away from the chamber 96.

The stem 87 has its upper end secured to piston 90 in piston assembly 89 and extends downwardly into body passage 57.

The piston assembly 89 is actuated by control valve which may be a solenoid, 4-way, two-position valve 93 fed by an air supply. Electrical controls 99 activates and deactivates the solenoid of the control valve 93. To open the valve, the solenoid is energized causing air flow from control valve 93 through line 92 into piston assembly lower chamber, while air in the upper chamber exhausts through line 91 and valve 93. The piston 90 moves upwardly against the assembly spring 95 until piston contacts adjustment rod 94.

In the normal deactivated position of the system, spring 95 forces piston 90 and stem 87 downwardly until stem tip 88 seats on the valve seat of port 62 shutting off the polymer flow therethrough. Energization of the control valve 93 causes the piston 90 and stem 87 to move upwardly opening port 62, permitting polymer to flow to die tip assembly 53.

In the valve assembly embodiment illustrated in FIG. 5, the valve stem closes port 62 thereby effecting on-off polymer flow. An alternate valve assembly is illustrated in FIGS. 12–14 of said application Ser. No. 599,006. This embodiment permits high pressure pulsing to clean the orifices and polymer flow passages as described therein.

Air Heater

The in-line electrical heater 54 is secured directly to the manifold 58 as illustrated in FIG. 4. Air at ambient temperature from line 24 flows through the heater 54 where it is heated to a temperature ranging from 300 to 1000 degrees Fahrenheit at pressure drops of 1 to 20 psi and at normal air flow rates of 0.5 to 30 SCFM per inch of die length (e.g., length of the row or orifices 83).

The in-line air heater 54 is described in detail in said application Ser. No. 599,006. Briefly, the heater comprises a series of electric coil loops arranged to provide effective heating with minimum pressure losses. An in-line heater useable in the present invention are manufactured by Sylvania GTE Co. In order to minimize heat losses, it is preferred that the heater 54 be mounted directly on the die assembly or within 12 inches, preferable 6 inches, therefrom.

OPERATION

The operation of the oil spill treatment by the present invention will be described with reference to (a) offshore spill containment and/or cleanup, and (b) land protection and cleanup.

In the offshore operation, a vessel or barge will be provided with a meltblowing system which may be similar to that illustrated in FIG. 1 and described herein. The components of the die assembly 14 are assembled as illustrated in FIGS. 3 and 4 and mounts on the end of boom 16. The electrical wires, and polymer and air hoses are connected as described previously.

With resin stored on board, the vessel can be maintained in "standby" readiness for a spill emergency. When a spill occurs the emergency vessel is capable of prompt response.

The resin can be any one of the variety of thermoplastics used in meltblowing operations. The typical meltblowing web forming resins include a wide range of polyolefins such as propylene and ethylene homopolymers and copolymers. Specific thermoplastics include ethylene acrylic copolymers, nylon polyamides, polyesters, EMA, polystyrene poly(methyl methacrylate), silicone sulfide, and poly(ethylene terephthalate), and blends of the above. The preferred resin is polypropylene. The above list is not intended to be limiting, as new and improved meltblowing thermoplastic resins continue to be developed. These resins, particularly polypropylene, are oleophilic and therefore ideally suited for oil cleanup.

Figure 6:
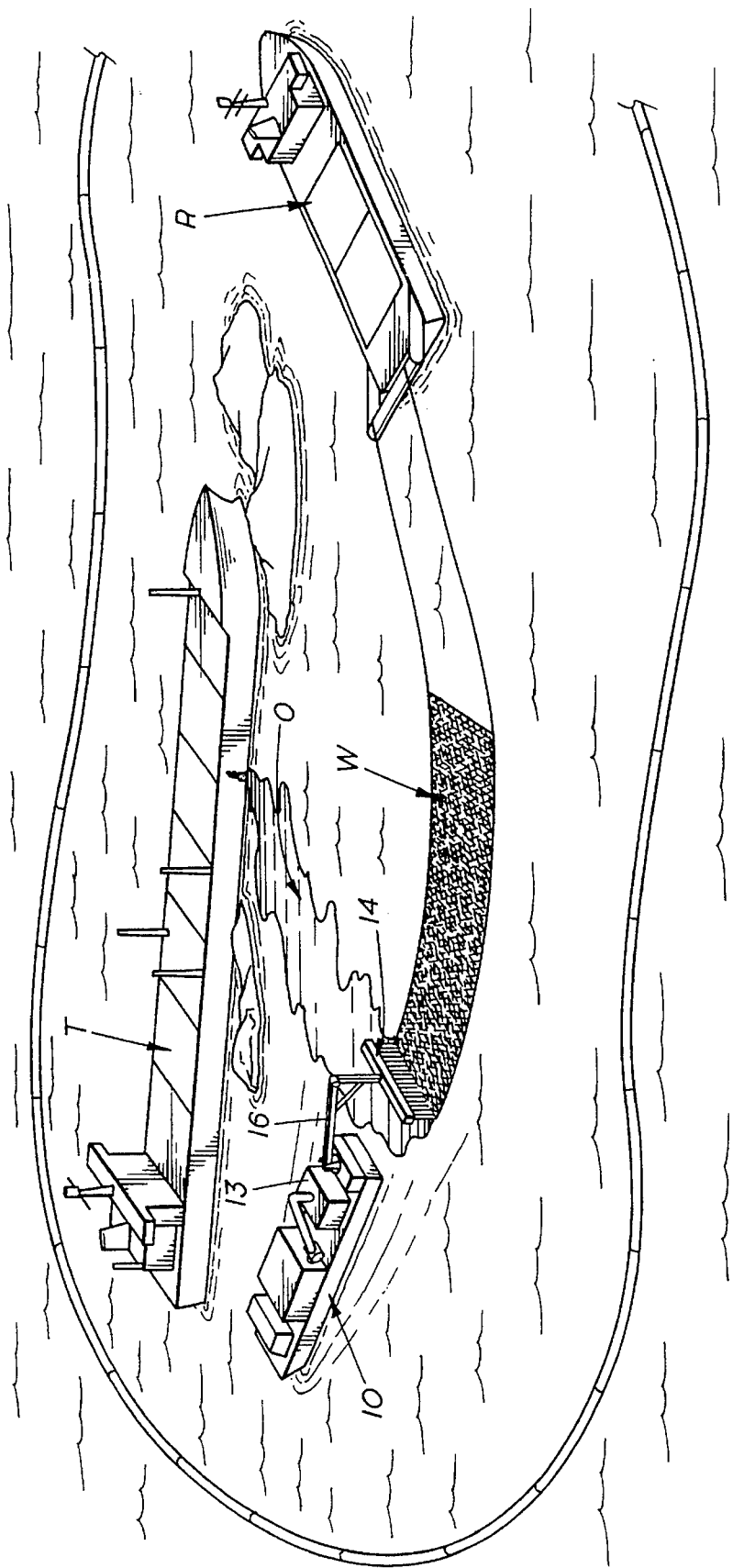
FIG. 6 is a schematic illustrating application of the present invention in offshore waters.

In FIG. 6, a tanker T is depicted as spilling oil O onto the water. The emergency vessel 10 equipped with meltblowing equipment is positioned near the spill as illustrated. The die assembly 14 is positioned near the water (e.g., between about 15 and 60 inches) as illustrated in FIG. 3 and meltblowing operation commenced. The polymer is extruded through the die orifices and drawndown by the converging sheets of hot air, depositing a web W on the water. The web W may be pulled through the oil spill by a boat and/or the web may be retrieved on a recovery barge R as illustrated in FIG. 6. In either type of operation, the microsized fibers randomly deposited and entangled on the water forming interstices or voids which, because their oleophilic property and capillary attraction, are capable of absorbing large quantities of oil while rejecting the water.

It is preferred that the meltblowing be carried out to provide a web of ¼ to 30 inches thick, preferably ½ to 12 inches thick, and most preferably 1 to 6 inches thick; and a width of 10 to 240 inches, preferably 30 to 72 inches; with a basis weight of between 1 to 1000 grams per square meter, preferably 10 to 1000 grams per square meter. The web will be at least 10 feet long and preferably at least 50 feet long. Lengths of 100 to 500 feet are most preferred.

Variations in the offshore cleanup operations include providing a portable meltblowing equipment on the tanker T itself, so that response to a spill can be immediate.

Another variation is to deposit the web around or partially around the spill to provide a barrier to prevent oil migration.

Still another variation is to meltblow the web on the vessel 10 or a platform adjacent the vessel and then deposit the continuous web onto the water. Common to all methods is the in situ generation of the meltblowing web and deployment of continuous web (50 feet to several hundred feet in length). The generation of the web on the vessel may take the form on in-line operation comprising meltblowing a continuous web, deploying the web into the water as it comes off the web takeup means, contacting the oil with the web, and retrieving the web. This in-line operation may also include means for applying an adhesive or reinforcement (such as a rope or scrim core) to the web prior to deployment to increase the web tensile strength. Adhesives (e.g., hot melt EVA) capable of bonding the meltblown fibers can be applied by use of a meltblowing equipment immediately downstream of the meltblowing equipment used to make the web. Suitable adhesives include spraying the EVA hot melt adhesive onto the web or, meltblowing the adhesive into the filament stream prior to collection wherein the filaments forming the web are provided with a coating or partial coating of adhesives which bonds the filaments together. Where a reinforcement core is used, the meltblown fibers may be secured to the core forming an elongate member covered or surrounded with the meltblown web. The core is strong permitting the composite to be deployed and maneuvered. The fibers may be meltblown directly onto the reinforcement such as a plastic rope, layer, net, scrim, and the like, or the meltblown web may be formed on the vessel and attached by clamps to the reinforcement upon deployment.

Figure 8:
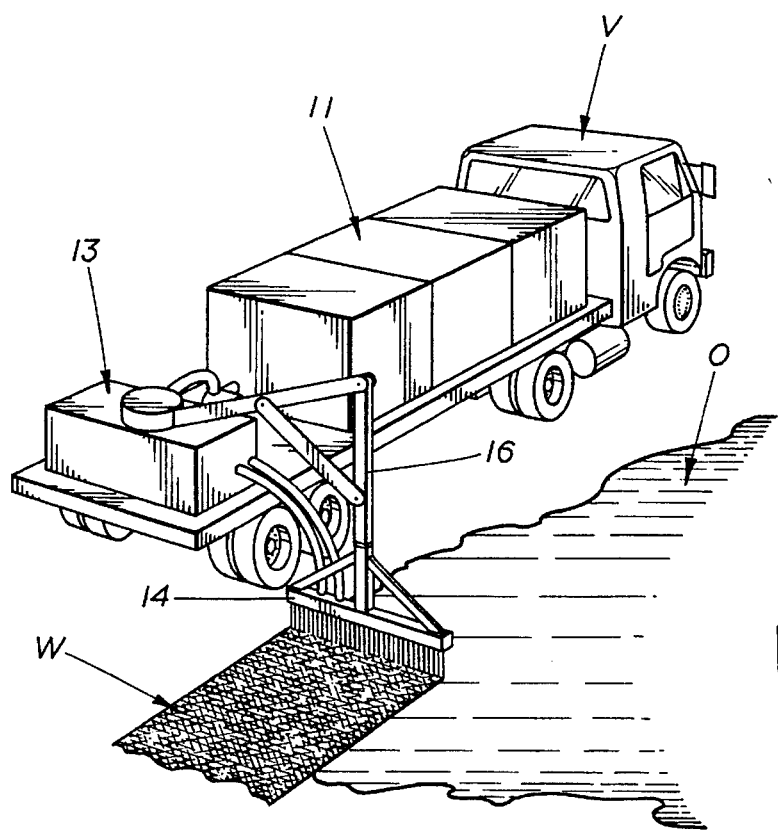
FIG. 8 is a schematic illustrating application of the present invention on land.

In land cleanup operations, the same meltblowing components, e.g., storage, transfer, polymer melt delivery system, meltblowing die, in-line electric air heater, and boom are mounted on a vehicle such as a truck or trailer, as schematically illustrated in FIG. 8. In this application, it is preferred to generate the web off board. As the vehicle moves along the beach on shore, the web W is placed on the land. The web W can be placed before the oil spill reaches the land thereby providing a protective coat or it can be placed after the spill to remove the oil from the shore. In either application, the web layer can be retrieved by merely pulling it off much in this manner of retrieving a film. The cohesive, integrated web W with oil dispersed therein is readily removable. Also, as noted above, the strength of the web W can be improved by applying an adhesive to the web either during meltblowing or after deposition or by providing a reinforcing layer or core in or with the web.

Figure 7:
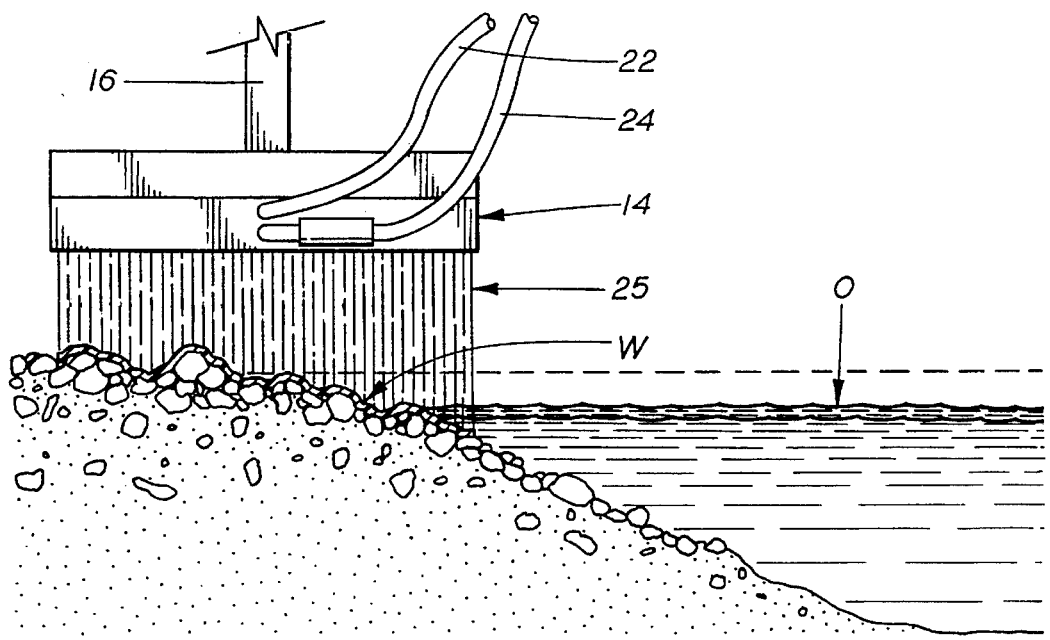
FIG. 7 is a sectional view of a portion of a beach illustrating the conforming coverage afforded by the meltblown web on an irregular terrain.

The meltblowing of the polymer onto the land offers a significant advantage not available from any of the prior art techniques. The meltblown polymer will conform to the terrain. Rocks, shells, or pebbles and generally irregular terrain make it impossible for the preformed pads to intimately contact and cover the shore. However, as illustrated in FIG. 7, polymer meltblown onto the land conforms to the terrain shape. The polymer penetrates the crevices and covers relief objects, substantially filling voids. This feature is important for both a protective coating and oil cleanup on the land. In the former, the cover fits like a glove protecting the crevices, voids and low spots. Any oil subsequently washing up will contact the oil absorbing web and sucked up. If a spill has already reached the shore, the web penetrates difficult places to reach.

In order to enhance the oil absorbency, the meltblown web may include oil absorbent material dispersed therein. The oil absorbent materials include oil absorbent particles which can be dispersed into the web by processes well known in the meltblowing art. See, for example, U.S. Pat. Nos. 4,100,324; 4,429,001; 4,724,114; 4,650,479; 4,755,178; and 4,773,903, the disclosures of which are incorporated herein by reference. Oil absorbent particles include around corn cobs, cellulose fibers, polymer particles (e.g., PP, PE, etc.), cotton fibers, linters, etc. These materials are oleophilic and are capable of being sprayed into or blown into the meltblown fibers.

The intermittent meltblowing die and self cleaning die are particularly preferred for carrying out the method of the present invention. The in-line air heater mounted on the dies assemble is also preferred because it permits the delivery of hot air with minimal heat losses.

While the present invention has been described with reference to preferred meltblowing equipment, it will be appreciated by those skilled in the art that the other types of meltblowing equipment may be used.

What is claimed is:

1. A method of recovery oil spilled on the surface of land which comprises:
    (a) meltblowing a plurality of side-by-side thermoplastic oleophilic fibers onto the land surface to form an oil absorbent meltblown web thereon and in close conformity therewith to contact and absorb the spilled oil; and
    (b) retrieving the web with oil absorbed therein.

2. The method of claim 1 wherein the web is made of a polyolefin selected from the group consisting of propylene and ethylene polymers and copolymers.

3. The method of claim 1 wherein the web deposited on the surface is between 10 to 240 inches wide and at least 10 feet long.

4. The method of claim 3 wherein the web is between 1 to 12 inches thick and has a basis weight of between 10 to 1000 grams per square meter.

5. A method of recovering oil spilled on the surface of land which comprises:
    (a) storing a thermoplastic resin on a vehicle;
    (b) transferring the resin to a polymer melt delivery system fixedly mounted on the vehicle;
    (c) melting the resin;
    (d) transferring the melt to a meltblowing die positioned offboard the vehicle and proximate the land surface at the end of a boom which is controlled relative to the polymer melt delivery system to permit adjustably locating the die relative the land surface;
    (e) meltblowing the melt through the die forming a plurality of filaments or fibers which are deposited at a preselected location on or near the land surface to form an oil absorbent meltblown web thereon in close conformity to the terrain of the land surface to contact and absorb spilled oil; and
    (f) recovering the web with oil absorbed therein.

6. The method of claim 5 wherein the web is at least 30 inches wide and at least 50 feet long.

* * * * *